United States Patent [19]
Craddock

[11] Patent Number: 5,053,692
[45] Date of Patent: Oct. 1, 1991

[54] TEMPERATURE DEPENDENT POWER SUPPLY FOR USE WITH A BRIDGE TRANSDUCER

[75] Inventor: Russell W. Craddock, Birmingham, Great Britain

[73] Assignee: Lucas Industries P.L.C., Birmingham, England

[21] Appl. No.: 506,349

[22] Filed: Apr. 9, 1990

[30] Foreign Application Priority Data

Apr. 14, 1989 [GB] United Kingdom ............... 8908518

[51] Int. Cl.⁵ .......................................... G05F 1/567
[52] U.S. Cl. ................................... 323/365; 73/766; 310/315; 323/907
[58] Field of Search ............... 323/365, 366, 367, 907, 323/349; 310/315; 73/727, 766

[56] References Cited

U.S. PATENT DOCUMENTS

| | | |
|---|---|---|
| 3,404,297 | 10/1968 | Fewings et al. |
| 3,841,150 | 10/1974 | Pearson ................................. 73/766 |
| 3,967,188 | 6/1976 | Spencer ................................ 307/310 |
| 4,558,238 | 12/1985 | Yamada et al. ....................... 323/907 |
| 4,686,450 | 8/1987 | Pichat ................................... 323/907 |

FOREIGN PATENT DOCUMENTS

| | | | |
|---|---|---|---|
| 108408 | 5/1984 | European Pat. Off. ............ | 323/907 |
| 185101 | 8/1987 | Japan ................................... | 73/766 |

Primary Examiner—William H. Beha, Jr.
Attorney, Agent, or Firm—Nixon & Vanderhye

[57] ABSTRACT

In order to compensate for the effects of temperature variations on a transducer such as a piezo-resistive bridge, the bridge is fed from a temperature dependent power supply circuit. The power supply circuit comprises a temperature sensitive element with first and second adjustment means for adjusting the slope of supply voltage for the transducer against temperature on first and second sides, respectively, of a predetermined temperature. The second adjustment means provides an adjustment which is independent of the first adjustment means so that repeated temperature cycling during calibration is unnecessary.

11 Claims, 3 Drawing Sheets

TEMPERATURE DEPENDENT POWER SUPPLY FOR USE WITH A BRIDGE TRANSDUCER

BACKGROUND OF THE INVENTION

1. Field of the Invention

The present invention relates to a transducer temperature compensation circuit.

2. Discussion of Prior Art

Transducers whose sensitivity varies with temperature are widely used in industry. In general, it is necessary to provide some form of compensation for the temperature variation of the sensitivity. For instance, piezoresistive bridge transducers when used in vehicles are subjected to a very wide range of temperatures, and compensation for the variation of sensitivity with temperature is essential in order for such transducers to provide a useful indication of a measured parameter.

Piezo-resistive bridge transducers generally exhibit a sensitivity which is non-linearly dependent on temperature. It is known to provide a temperature compensation arrangement for such a transducer by means of a bridge power supply employing a thermistor network to control the bridge energising voltage, and hence transducer sensitivity, in accordance with temperature. The required slope of the temperature-dependence of the network is calculated from sensitivity measurements of the transducer. Although this technique provides compensation, it is difficult to achieve high accuracy without careful calibration.

Temperature compensation can be improved by trimming the compensation circuit at two or more temperatures so as to adjust the sensitivity of the transducer at these temperatures to required values. However, such techniques require repeated temperature cycling because the trimming procedures are not independent of each other i.e. trimming at one temperature affects the trim at another temperature.

SUMMARY OF THE INVENTION

According to the invention, there is provided a transducer temperature compensation circuit, comprising a temperature dependent power supply circuit for connection to a transducer whose sensitivity varies with power supply, the power supply circuit comprising a temperature sensitive element for varying the power supply circuit output in response to temperature variations, first adjustment means for adjusting the slope of the power supply circuit output with respect to temperature at one side of a predetermined temperature, and second adjustment means for adjusting the slope of the power supply circuit output with respect to temperature at the other side of the predetermined temperature independently of the slope set by the first adjustment means.

Preferably the first adjustment means is arranged to adjust the slope of the power supply circuit output at the one side of the predetermined temperature independently of the slope set by the second adjustment means.

Preferably the power supply circuit includes third adjustment means for adjusting the power supply circuit output at the predetermined temperature independently of the slopes set by the first and second adjustment means.

Preferably the power supply circuit comprises an operational amplifier whose inverting input is connected via a resistor to a temperature dependent potentiometer and whose non-inverting input is connected to receive a reference voltage, the first adjustment means comprises a first variable resistor connected in series with a diode between the output and the inverting input of the operational amplifier, the second adjustment means comprises a variable resistor connected between the output and the inverting input of the operational amplifier, and the third adjustment means comprises means for setting the reference voltage and the voltage at the inverting input of the operational amplified to the same value.

It is thus possible to provide a transducer temperature compensation circuit which may be used with a piezoresistive bridge transducer and which allows the sensitivity of the transducer to be trimmed by mutually independent trimming operations at several temperatures. The need for temperature cycling during trimming is thus eliminated.

BRIEF DESCRIPTION OF THE DRAWINGS

The invention will be further described, by way of example, with reference to the accompanying drawings, in which.

DETAILED DISCUSSION OF PREFERRED EMBODIMENTS

Figure 1:
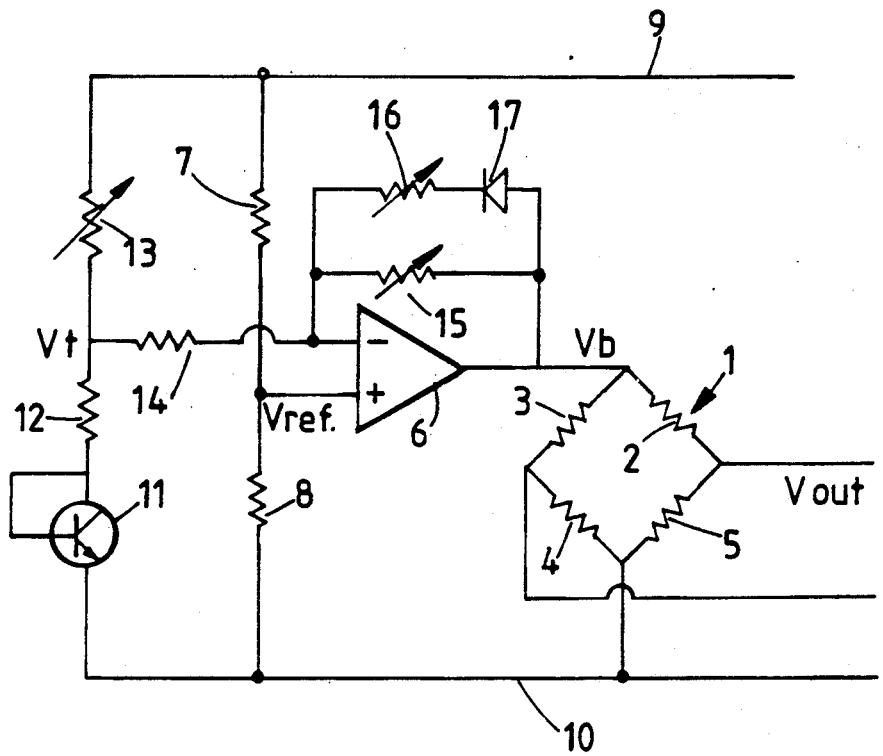
FIG. 1 is a circuit diagram of a transducer temperature compensation circuit constituting a preferred embodiment of the invention.

The temperature compensation circuit shown in FIG. 1 is connected to a piezo-resistive bridge transducer 1, which comprises piezo-resistive elements 2 to 5 connected in a Wheatstone bridge circuit. The bridge transducer has a first pair of diagonally opposite nodes across which is developed the transducer output voltage $V_{out}$. The other pair of diagonally opposite nodes receives a supply voltage from the temperature compensation circuit.

The temperature compensation circuit comprises an operational amplifier 6 whose non-inverting input is connected to a pair of resistors 7 and 8 which are connected in series between a power supply line 9 and a common line 10. The resistors 7 and 8 act as a potential divider supplying a reference voltage $V_{ref}$ to the non-inverting input of the operational amplifier 6.

A diode-connected transistor 11 is connected in series with a resistor 12 and a variable resistor 13 between the supply line 9 and the common line 10. The connection between the resistor 12 and the variable resistor 13 is connected via a resistor 14 to the inverting input of the operational amplifier 6. A variable resistor 15 is connected between the inverting input and the output of the operational amplifier 6. A variable resistor 16 is connected between the inverting input and the cathode of a diode 17, whose anode is connected to the output of the operational amplifier 6.

Figure 2:
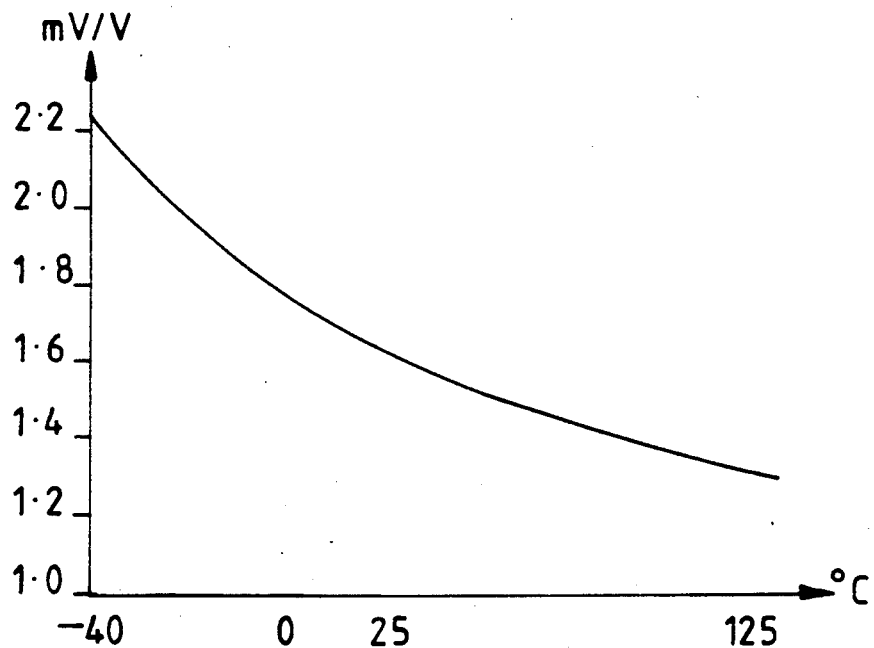
FIG. 2 is a graph of millivolts per volt against temperature illustrating the temperature dependence of the sensitivity of a typical piezo-resistive bridge transducer.

FIG. 2 illustrates graphically the sensitivity of the bridge transducer 1 against temperature. The sensitivity is measured as millivolts per volt of the voltage supplied to the bridge by the compensation circuit whereas temperature is measured in degrees centigrade (celsius]. Thus, as the temperature of the piezoresistive elements 2 to 5 rises, the sensitivity falls.

The temperature compensation circuit provides a supply voltage to the bridge transducer 1 which approximates the inverse of the curve illustrated in FIG. 2 so as to eliminate, or at least reduce, the temperature dependency of the sensitivity of the transducer. The variable resistors 13, 15, and 16 are adjusted as follows so as to trim the temperature compensation circuit to the transducer characteristics illustrated in FIG. 2.

The reference voltage $V_{ref}$ is set, by suitable choice of the resistors 7 and 8, to provide the nominal bridge transducer drive voltage $V_b$ for room temperature, indicated in FIG. 2 as 25° C. The actual value of the reference voltage $V_{ref}$ need not be accurate so that the resistors 7 and 8 do not require trimming. The transistor 11 is brought to 25° C. and the variable resistor 13 is adjusted so that the voltage $V_t$ is equal to the reference voltage $V_{ref}$ (for instance 4 volts).

The transistor 11 is brought to a temperature of −40° C., as a result of which the voltage $V_t$ increases to a value greater than the reference voltage $V_{ref}$. The bridge supply voltage $V_b$ is, by the action of the operational amplifier 6, also the voltage at the inverting input. The diode 17 is therefore reverse-biased so that no current flows through the diode and the variable resistor 6. The variable resistor 15 is adjusted so as to set the bridge supply voltage $V_b$ to, for instance, 2.86 volts.

Finally, the transistor 11 is brought to a temperature of 25° C. The voltage across the transistor 11 thus falls and the bridge supply voltage $V_b$ exceeds the voltage at the inverting input so that current now flows through the diode 17. The variable resistor 16 is adjusted so as to set the bridge supply voltage $V_b$, for instance to 4.80 volts.

The variation in the bridge supply voltage $V_b$ with temperature thus provides compensation for the varying sensitivity of the transducer 1 as illustrated in FIG. 2 so that the overall temperature dependence of the sensitivity of the arrangement is greatly reduced. Trimming of the temperature compensation circuit requires three independent trimming operations and thus avoids the need for any repeated temperature cycling. This reduces the time and inconvenience of setting up the temperature compensation circuit.

Various modifications may be made within the scope of the invention. For instance, the transistor 11 may be replaced with a negative temperature co-efficient thermistor. Alternatively, the resistor 13 may be replaced by a positive temperature co-efficient thermistor and the transistor 11 replaced by a short circuit. In a further alternative, the positive temperature co-efficient element may be provided by an "on-chip" resistor forming part of a silicon sensor in which the temperature co-efficient of the sensor is matched to the temperature co-efficient of the resistor.

The operational amplifier 6, the resistor 14, the resistors 15 and 16, and the diode 17 constitute a type of function generator which effectively has a single brake point and two slopes in order to provide a two line segment approximation to the exact curve required to compensate for the temperature characteristic of the transducer sensitivity. It is possible to add one or more further brake points and line segments with the position of each brake point and the slope of each line segment being independently adjustable, so that more accurate line segment approximations to the ideal compensation function can be achieved.

Figure 3:
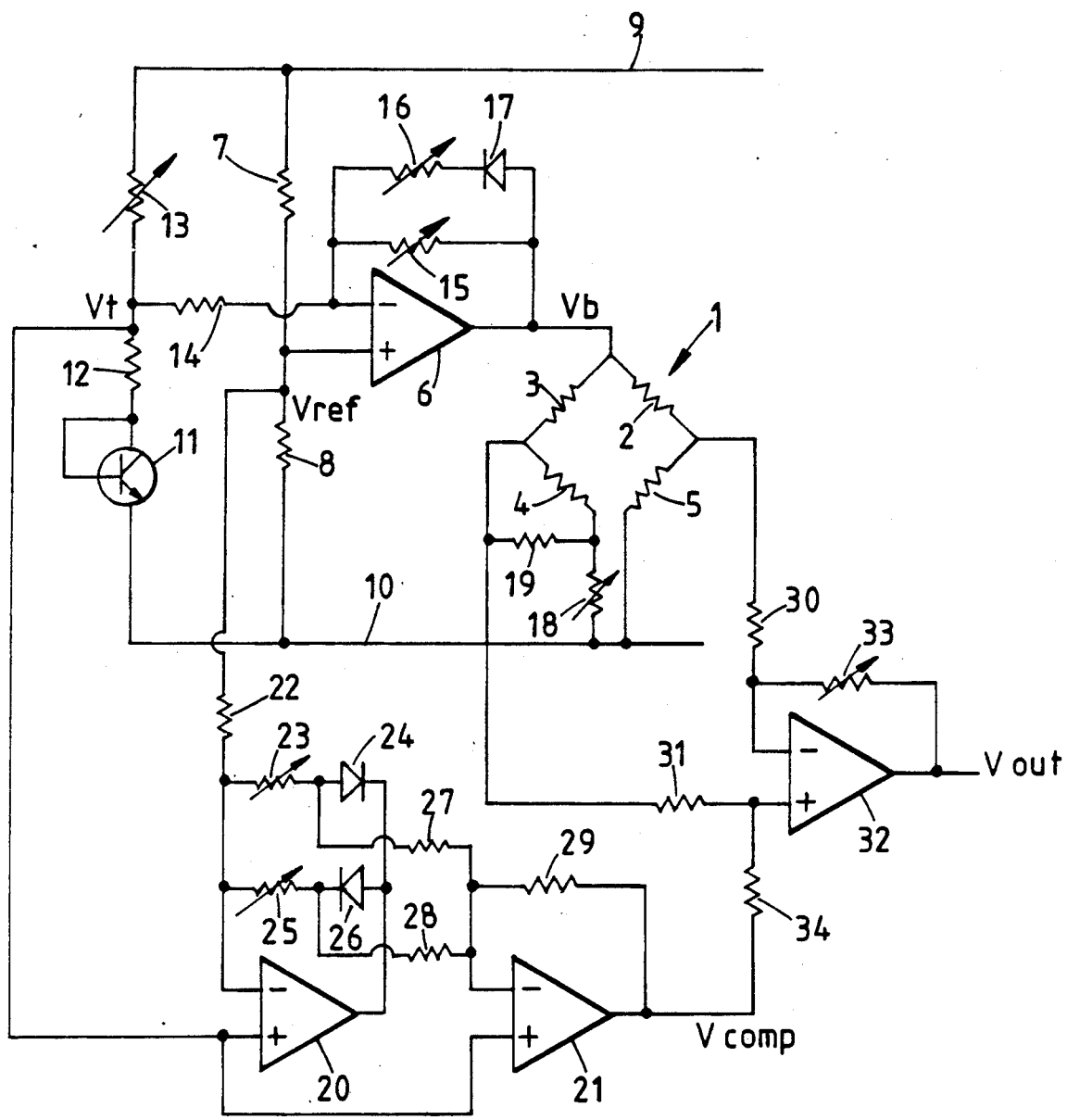
FIG. 3 is a circuit diagram of a transducer temperature compensation circuit constituting a second embodiment of the invention.

The transducer temperature compensation circuit shown in FIG. 3 represents a modification of the circuit shown in FIG. 1. Like reference numerals refer to like parts, which will not be described again. Similarly, the procedure for setting the variable resistors 13, 15, and 16 is the same as for the embodiment of FIG. 1 and will not be described again.

The circuit of FIG. 3 is capable of providing more accurate temperature compensation where more accurate transducer measurements are required by eliminating or reducing the effects of bridge offset voltages as will be described hereinafter. Such offset voltages vary as non-linear functions of temperature with each individual sample of bridge having its own such function. However, compared with the circuit of FIG. 1, some simplicity of adjustment is sacrificed for the sake of increased accuracy.

The bridge 1 of FIG. 3 differs from that of FIG. 1 in that the element 4 is connected in series with a variable resistor 18, which is used to set the circuit offset at room temperature (25° C.). Also, a resistor 19 may be connected in parallel with the bridge element 4 to provide additional compensation, as will be described hereinafter.

The temperature indicating voltage $V_t$ is supplied to the non-inverting inputs of operational amplifiers 20 and 21. The inverting input of the operational amplifier 20 receives the reference voltage $V_{ref}$ via a resistor 22. The operational amplifier 20 is provided with first and second negative feedback paths, the first comprising the series connection of a variable resistor 23 and a diode 24 and the second comprising the series connection of a variable resistor 25 and a diode 26. The cathode of the diode 24 and the anode of the diode 26 are connected to the output of the operational amplifier 20. The connection between the anode of the diode 24 and the variable resistor 23 and the connection between the cathode of the diode 26 and the variable resistor 25 provide two outputs which are connected via input resistors 27 and 28 to the inverting input of the operational amplifier, which is provided with a negative feedback resistor 29. The output of the amplifier 21 provides a compensating voltage $V_{comp}$.

The output nodes of the bridge 1 are connected via resistors 30 and 31 to the inverting and non-inverting inputs, respectively, of an operational amplifier 32. A variable resistor 33 is connected between the inverting input and the output of the operational amplifier 32. A resistor 34 is connected between the non-inverting input of the operational amplifier 32 and the output of the operational amplifier 21. The amplifier 32 and associated resistors function as a differential amplifier but provide some common mode gain as will be described hereafter.

Piezo-resistive sensors frequently exhibit offset variations with temperature which have either positive or negative slope and which are highly non-linear. In order to compensate for such offsets, all possible offsets are first arranged to appear negative by selecting the value of the resistor 34 so as to introduce common mode gain to the differential amplifier. This common mode gain therefore amplifies the effect of the varying bridge possible positive offset slope at the output of the amplifier 32 resulting from negative slope in the bridge. In particular, if the resistors 30 and 31 have equal values, then the value of the resistor 34 is selected so as to have a smaller value than the resistor 33 (allowing for the output impedance of the operational amplifier 21 which is in series with the resistor 34).

The output voltage at the connection between the variable resistor 25 and the diode 26 decreases with the increasing temperature with a slope determined by the value of the variable resistor 25 until the temperature at which $V_t$ is equal to $V_{ref}$ (normally 25° C.). For further temperature increases, the output voltage then remains at $V_t$. For temperatures greater than that for which $V_t$ equals $V_{ref}$, the voltage at the connection between the variable resistor 23 and the diode 24 decreases with a slope determined by the value of the resistor 23. For lower temperatures, the voltage remains at $V_t$.

The two output voltages from the feedback networks of the operational amplifier 20 are summed by the amplifier 21 to provide the compensation voltage $V_{comp}$ and supplied to the differential amplifier via the resistor 34 so as to compensate for the offset variations.

In order to set up the circuit of FIG. 3, four further adjustments are required compared with the circuit of FIG. 1. is adjusted to set the required circuit gain.

The bridge 1 is balanced by means of the variable resistor 18 at room temperature as described above. The value of the resistor 34 is chosen so as to ensure that any bridge offsets appear with a negative slope at the output of the operational amplifier 32. In particular, the value of the resistor 34 is chosen so that, for a range of circuit gains and values of the resistor 33, the offsets for all or most of a set of individual bridges have a negative slope with respect to temperature at the output of the operational amplifier 32. If any individual bridges exhibit greater variations in offset falling outside the range covered by the value of the resistor 34, the resistor 19 is connected as shown so that the selected value of the resistor provides the required action.

The variable resistors 23 and 25 are adjusted independently of each other to set the slopes for temperatures above and below room temperature so as to provide a two segment approximation to the actual offset compensation function. The dependency of the output signal $V_{out}$ on temperature is therefore reduced even further compared with the circuit of FIG. 1 and, although the additional adjustments as mentioned above are required, these can be performed in a non-interacting way so that temperature cycling during adjustment remains unnecessary.

Figure 4:
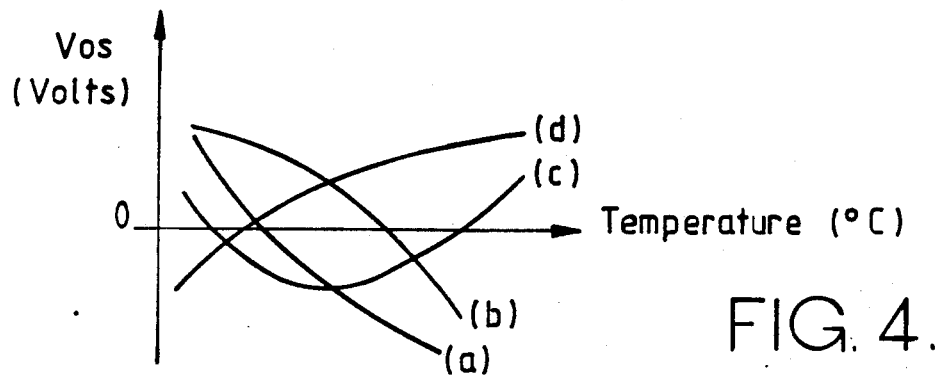
FIG. 4 to 7 are graphs of various voltages with respect to temperature in degrees celsius illustrating operation of the circuit of FIG. 3.
Figure 5:
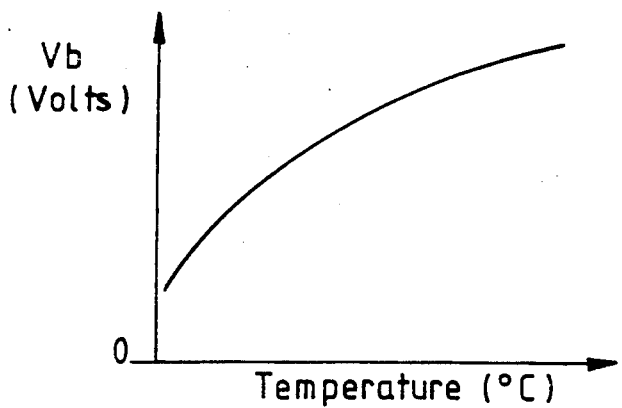

In more detail, FIG. 4 illustrates by curves (a) to (d) various functions of offset voltage B with respect to temperature for four different individual samples of bridges 1 which nominally have the same characteristics. As can be seen, the actual functions between offset voltage and temperature can vary considerably. FIG. 5 illustrates the variation of bridge supply voltage $V_b$ with temperature, from which it is apparent that there is no simple relationship between the bridge supply voltage and the various offset voltage functions.

In a typical application using a typical bridge 1, the differential amplifier is arranged such that the resistors 30 and 31 have the same value ($R_{in}$), the resistors 33 and 34 have the values $R_F$ and $R_T$, respectively, the voltage at the connection between the resistors 3 and 4 of the bridge 1 is V, and the voltage at the connection between the resistors 2 and 5 of the bridge 1 is $V+\Delta V$. The output voltage $V_{out}$ is then given by the following expression:

$$V_{out} = V_{comp}\frac{R_F + R_{in}}{R_T + R_{in}} + V\frac{R_T - R_F}{R_T + R_{in}} - \Delta V\frac{R_F}{R_{in}}$$

In the absence of a stimulus (measurand) to the bridge 1, V is equal to the bridge offset voltage and V is equal to half the bridge supply voltage ($V_b/2$).

Figure 6:
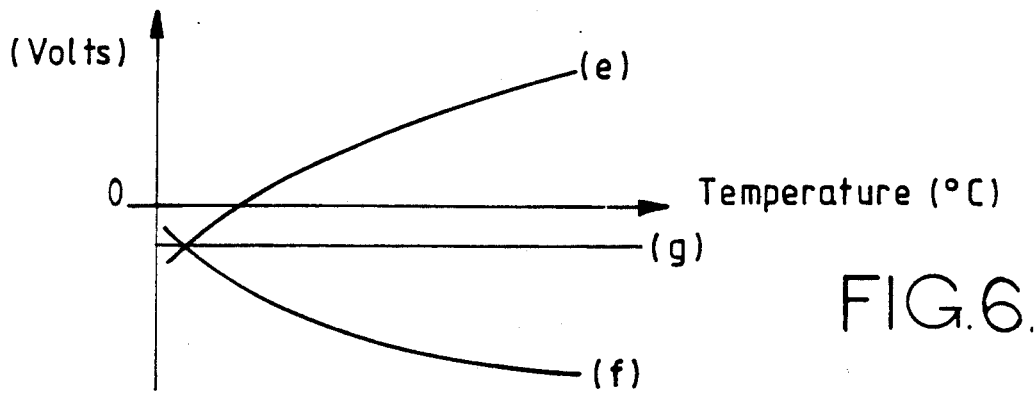

In order to compensate for any of the curves (a) to (d) shown in FIG. 4, the value $R_F$ of the resistor 33 is selected so that the differential amplifier provides an adequate range of gains for the range of basic sensitivities of individual samples of the bridge 1. If it is assumed that the curve (a) in FIG. 4 represents the worst case function of bridge offset voltage $V_{os}$ with respect to temperature, then the curve (e) shown in FIG. 6 illustrates the effect of the amplification provided by the differential amplifier on this offset and represents the offset voltage $V_{os}$ multiplied by the gain of the differential amplifier ($-R_F/R_{in}$). In other words, this represents the differential mode gain of the differential amplifier to the offset voltage of the bridge.

In order to compensate for this worst case offset voltage function, the value $R_f$ of the resistor 34 is chosen so as to provide common mode gain in the differential amplifier which amplifies the common mode voltage at the inputs thereof to provide a curve (f) as shown in FIG. 6 which is substantially the inverse of the curve (e). The curve (f) represents half of the bridge supply voltage multiplied by the common mode voltage gain of the differential amplifier, that is:

$$\frac{V_b}{2} \times \frac{R_T - R_F}{R_T + R_{in}}$$

The effect of this is to eliminate or greatly reduce the temperature variation of offset voltage appearing at the output of the amplifier 32 so that, for a bridge whose offset voltage against temperature is represented by the curve (a) in FIG. 4, the function of offset voltage with respect to temperature at the output of the amplifier 32 is given by the curve (g) in FIG. 6. The curve (g) is substantially a straight line parallel to the temperature axis i.e. horizontal (of zero slope). For the curve (a), the resulting compensated curve (g) can be displaced so as to coincide with the temperature axis in FIG. 6 by appropriate adjusting the variable resistor 18.

Figure 7:
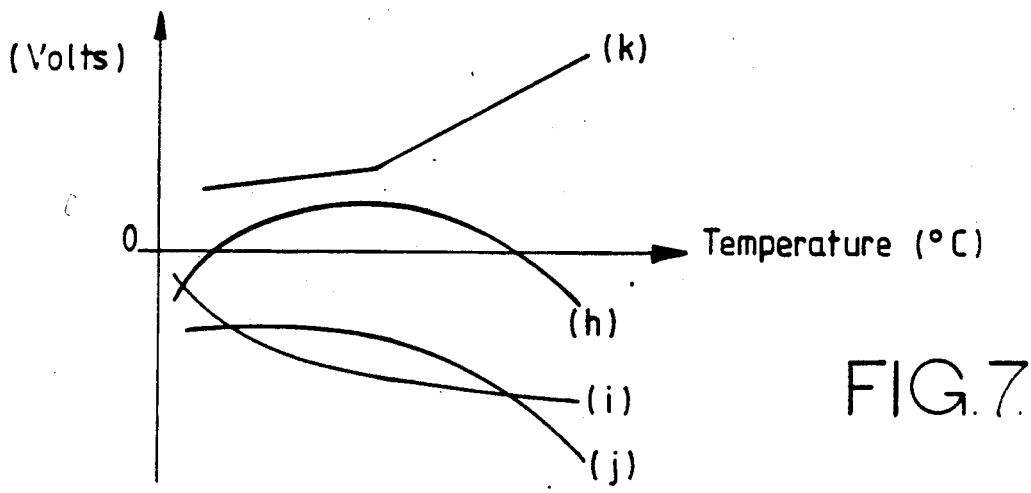

For most or all other individual samples of the bridge 1, the functions of offset voltage against temperature, for instance as illustrated by the curves (b) to (d) in FIG. 4, will effectively have slopes which are less negative than the curve (a). As noted above, for any individual samples of the bridge having extreme functions which exhibit a greater negative slope, the resistor 19 can be connected as shown in FIG. 3 so as to alter the slope to a less negative value than that of the curve (a). Taking the curve (c) of FIG. 4 as an example of another typical bridge, FIG. 7 illustrates further compensation to eliminate or reduce the effects of bridge offset voltage.

Curve (h) represents the effect of the differential voltage gain of the differential amplifier applied to the curve (c), that is:

$$-V_{os} \cdot \frac{R_F}{R_{in}}$$

Curve (i) is identical to the curve (f) shown in FIG. 6 and represents the effect of common mode gain, that is:

$$\frac{V_b}{2} \times \frac{R_T - R_F}{R_T + R_{in}}$$

Curve (j) represents the combination of the curves (h) and (i) and is typical of those individual samples of bridges which exhibit a function of offset voltage with respect to temperature which is less negative than that represented by the curve (a) in FIG. 4.

In order to compensate for the curve (j), the operational amplifiers 20 and 21 and their associated components supply a compensating voltage $V_{comp}$ to the resistor 34 and this contributes to the output voltage of the amplifier 32 in accordance with the following expression:

$$V_{comp} \frac{R_F + R_{in}}{R_T + R_{in}}$$

Curve (k) in FIG. 7 illustrates this contribution which, as is apparent from the above expression, represents the product of a gain function of the differential amplifier and a function having two straight line segments of different gain so that the composite function represents an approximation to the inverse of the function represented by the curve (j) in FIG. 7. The effects of combining the functions represented by the curves (j) and (k) are to reduce substantially the contribution to the output voltage of the operational amplifier 32 caused by the offset voltage within a temperature range for each individual sample of the bridge 1. Thus, the circuit of FIG. 3 can be trimmed for the effects of individual variations in offset voltages and functions of offset voltages with respect to temperature so as to compensate for tolerances in the manufacture of bridges. By eliminating or greatly reducing the effects of offset voltages, the precision and accuracy of bridge measurements is substantially improved.

I claim:

1. A transducer temperature compensation circuit for providing an output to a transducer having a sensitivity which varies with power supply, said circuit comprising:
   a temperature sensitive element;
   a power supply having an output variable in response to said temperature sensitive element in response to temperature variations;
   first adjustment means for adjusting a first slope of the power supply output with respect to temperature at one side of a predetermined temperature;
   second adjustment means for adjusting a second slope of the power supply output with respect to temperature at another side of the predetermined temperature independently of the first slope adjusted by said first adjustment means;
   third adjustment means for adjusting the power supply output at the predetermined temperature independently o the first and second slopes adjusted by said first and second adjustment means; wherein said circuit further includes an operational amplifier having inverting and non-inverting inputs and an output, a temperature dependent potentiometer including said temperature sensitive element for providing a temperature dependent voltage, a first re 1 connected between said temperature dependent potentiometer and said inverting input, a reference voltage source for providing a reference voltage connected to said non-inverting input, said first adjustment means comprising a first variable resistor and a diode connected in series between said output and said inverting input, said second adjustment means comprising a second variable resistor connected between said output and said inverting input, and said third adjustment means comprising means for setting the reference voltage and the temperature dependent voltage at a same value at the predetermined temperature.

2. A compensation circuit as claimed in claim 1, in which said first adjustment means adjusts the first slope of the power supply output at the one side of the predetermined temperature independently of the second slope adjusted by said second adjustment means.

3. A compensation circuit as claimed in claim 1 for use with a bridge transducer having first and second outputs and first and second supply inputs for connection to said power supply circuit, said compensation circuit comprising a differential amplifier having first and second inputs for connection to the first and second outputs of the bridge transducer, said differential amplifier having a predetermined common mode gain.

4. A compensation circuit as claimed in claim 4, comprising a function generator having an input and an output and having an adjustable non-linear transfer function, said input and said output of said function generator being connected to said temperature sensitive element and said differential amplifier, respectively.

5. A compensation circuit as claimed in claim 4, in which said function generator has a transfer function comprising first and second straight line segments, said function generator comprising fourth adjustment means for adjusting a slope of the first straight line segment and fifth adjustment means for adjusting a slope of the second straight line segment.

6. A combination of a compensation circuit as claimed claim 3 and the bridge transducer, in which said in claim bridge transducer has a resistive limb comprising: a resistive element having a first terminal, which is connected to said first output of said bridge transducer, and a second terminal; and a third variable resistor having a first terminal, which is connected to said first supply terminal of said bridge transducer, and a second terminal which is connected to said second terminal of said resistive element, said bridge transducer further comprising a second resistor having first and second terminals connected to said first and second terminals, respectively, of said resistive element.

7. A transducer temperature compensation circuit comprising a temperature dependent power supply circuit for connection to a transducer having a sensitivity which varies with power supply, said temperature dependent power supply circuit comprising a temperature sensitive element for varying a power supply output in response to temperature variations, first adjustment means for adjusting a first slope of the power supply output with respect to temperature at one side of a predetermined temperature, second adjustment means for adjusting a second slope of the power supply output with respect to temperature at another side of the predetermined temperature independently of the first slope adjusted by said first adjustment means, and third adjustment means for adjusting the power supply output at the predetermined temperature independently of the first and second sloes adjusted by said first and second adjustment means, said power supply circuit comprising an operational amplifier having inverting and non-inverting inputs and an output, a temperature dependent potentiometer including said temperature sensitive element for providing a temperature dependent voltage, a first resistor connected between said temperature dependent potentiometer and said inverting input, and a reference voltage source for providing a reference voltage connected to said non-inverting input, said first adjustment means comprising a first variable resistor and a diode connected in series between said output and said inverting input, said second adjustment means comprising a second variable resistor connected between said output and said inverting input, and said third adjustment means comprising means for setting the reference voltage and the temperature dependent voltage at a same value at the predetermined temperature.

8. A compensation circuit as claimed in claim 7, in which said first adjustment means adjusts the first slope of the power supply output at the one side of the predetermined temperature independently of the slope adjusted by said second adjustment means.

9. A transducer temperature compensation circuit comprising a temperature dependent power supply circuit for connection to a bridge transducer having firs and second outputs, first and second supply inputs for connection to said power supply circuit, and a sensitivity which varies with power supply, said temperature dependent power supply circuit comprising a temperature sensitive element for varying a power supply output in response to temperature variations, first adjustment means for adjusting a first slope of the power supply output with respect to temperature at one side of a predetermined temperature, second adjustment means for adjusting a second slope of the power supply output with respect to temperature at another side of the predetermined temperature independently of the first slope adjusted by said first adjustment means, and an offset compensation circuit comprising means for generating an offset compensation and a differential amplifier having first and second outputs of the bridge transducer and a common mode input, said offset compensation generating means being connected between said temperature sensitive element and said common mode input.

10. A combination of a compensation circuit as claimed in claim 9 and the bridge transducer, in which said bridge transducer has a resistive limb comprising: a resistive element having a first terminal, which is connected to said first output of said bridge transducer, and a second terminal; and a third variable resistor having a first terminal, which is connected to said first supply terminal of said bridge transducer, and a second terminal which is connected to said second terminal of said resistive element, said bridge transducer further comprising a second resistor having first and second terminals connected to said first and second terminals, respectively, of said resistive element.

11. A compensation circuit as claimed in claim 9 in which said offset compensation generating means comprises a function generator having an input and an output and having an adjustable non-linear transfer function.

* * * * *